Oct. 22, 1940.  E. GOLDBERG  2,219,069

VEHICLE WHEEL

Filed Jan. 3, 1940

INVENTOR
*Elias Goldberg*
BY
ATTORNEY

Patented Oct. 22, 1940

2,219,069

UNITED STATES PATENT OFFICE 2,219,069

VEHICLE WHEEL

Elias Goldberg, New York, N. Y.

Application January 3, 1940, Serial No. 312,242

3 Claims. (Cl. 152—51)

This invention relates to new and useful improvements in a vehicle wheel.

More specifically, the invention proposes the construction of a vehicle wheel characterized by a hub body adapted to be mounted upon a driven axle for supporting a tire either of the solid rubber or the inflated variety.

Still further it is proposed to arrange an annular resilient member between said hub body and a rim body in a manner to permit said rim body to move relative to said hub body in a manner to cause said resilient member to absorb the normal road shocks.

Still further it is proposed to provide a drive pin mounted within a radial slot extending to the periphery of said hub body and connected with the side walls of said rim body in a manner to connect said rim body to said hub body to cause said rim body to rotate with said hub body when the hub body is rotated.

Still further it is proposed to provide a strip of metal disposed between the hub body and the resilient member and having its ends adjacent each other, and the provision of a means mounted within said radial slot and extending across the open end thereof in a manner to prevent the ends of said strip of metal from being bent to engage into said slot when said strip of metal creeps around said wheel to a position in which the ends thereof will be aligned with said slot.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

The vehicle wheel, according to this invention, includes a hub body 10 for engagement on an axle rod and of cylindrical form and having a radial slot 11 extending to its periphery. The hub body, more specifically, comprises a hub portion $10^a$ adapted to be engaged upon an axle provided with a groove $10^{aa}$. The axle is adapted to be formed with a key for engaging the groove $10^{aa}$ for locking the hub body to the axle. This hub body 10 further includes a plurality of radially extending spokes $10^b$ which are connected with a rim $10^c$. The slot 11 extends outwards to the periphery of the rim $10^c$.

While this hub portion 10 is shown provided with a plurality of spokes $10^b$ it may be formed solidly of any desired form as long as it carries an opening for engaging upon an axle rod.

Figure 1:
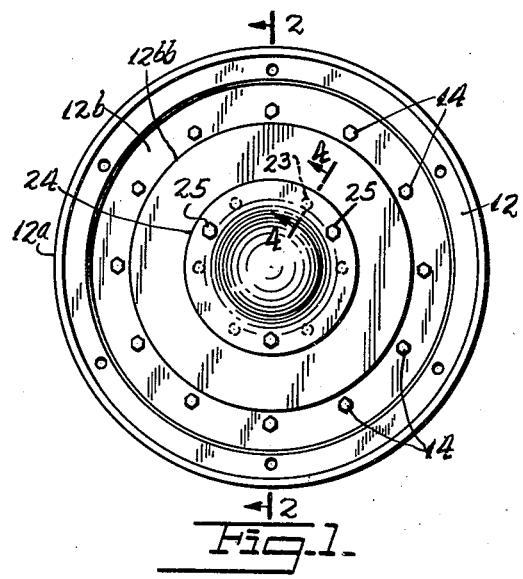
Fig. 1 is a side elevational view of a vehicle wheel constructed in accordance with this invention.
Figure 2:
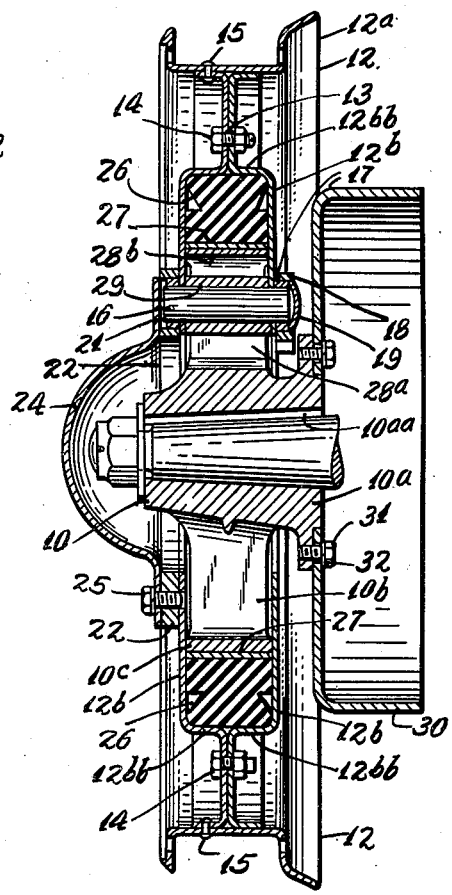
Fig. 2 is an enlarged sectional view on the line 2—2 of Fig. 1.
Figure 3:
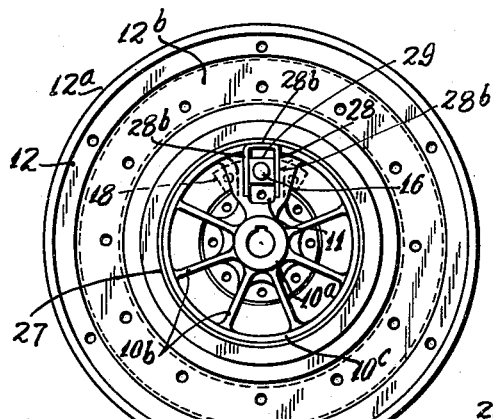
Fig. 3 is a view similar to Fig. 1 with one side wall thereof removed.
Figure 4:
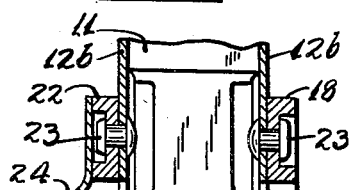
Fig. 4 is an enlarged sectional view on the line 4—4 of Fig. 1.
Figure 5:
Fig. 5 is a perspective view of the U-shaped lining element per se.
Figure 6:
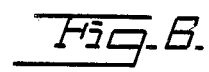
Fig. 6 is a perspective view of the drive sleeve.

A rim body 12 for supporting a tire is also provided for the vehicle wheel. This rim body 12 is formed separately of the hub body 10 and consists of a rim felloe $12^a$ upon which a tire is adapted to be mounted. This tire may be of the solid rubber or the inflated variety, as desired. The rim body 12 further includes annular side walls $12^b$ for extending along the faces of the hub body 10. These side walls $12^b$ are formed with offset portions $12^{bb}$ for permitting portions thereof to abut each other as shown in Fig. 2. These portions which abut each other are formed with openings 13 through which bolts 14 are adapted to be passed for connecting the side walls together. The side walls $12^b$ have their outer edges directed away from each other and extending along the rim felloe $12^a$. One of the outwardly directed edges of the side walls $12^b$ is connected to the rim felloe $12^a$ by means of rivets 15.

A drive pin 16 is extended between the side walls $12^b$ and passes through the slot 11 formed in the hub body 10. The pin 16 is adapted to slide along the length of the slot 11 and is provided for fixedly connecting the rim body to the hub body to cause the rim body to rotate with the hub body when the hub body is rotated. One end of the drive pin 16 carries a bushing 17 which is pressed into drive pin laminae 18. A cap 19 is forced into position in the pin laminae 18 to prevent pin 16 from working out. Pin laminae is securely fastened to the side wall by rivets. The other end of the pin 16 carries a bushing 20 which is pressed in an opening 21 formed in an annular member 22 arranged concentrically with the hub portion $10^a$ of the hub body 10. This annular member 22 is securely attached to one of the side walls $12^b$ of the rim body 12 by means of a plurality of rivets 23.

A hub cap 24 is in turn mounted upon the rim body 22 and extends over the outer end of the hub portion $10^a$ of the hub body 10. This hub cap 24 is maintained in position by means of a plurality of bolts 25 which extends through openings formed in the hub cap 24 and are threadedly engaged into complementary openings formed in the annular member 22.

An annular resilient member 26 is mounted between the side walls 12$^b$ and is disposed between the rim 10$^c$ of the hub body 10 and the offset portions 12$^{bb}$ of the side walls 12$^b$ of the rim body 12. This annular resilient member is preferably constructed of rubber and is arranged to absorb road shocks by permitting the rim body 12 to move relative to the hub body to compress the resilient member and prevent the road shocks from being transferred to the hub body 10 and so to the body of the vehicle proper. A strip of metal 27 is disposed between the adjacent faces of the resilient member 26 and the rim 10$^c$ of the hub body 10. This strip of metal has its ends adjacent each other and a means is provided for preventing the ends thereof from being bent into the slot 11 when the strip of metal creeps around to a position in which the ends will be aligned with this slot. This means comprises a U-shaped lining element 28 engaged within the radial slot 11 and having its arm 28$^a$ extending along the sides of the slot and its central portion 28$^b$ bridging the open end of the radial slot for supporting the ends of said strip as they creep to the position in which they will be aligned with the slot. If it were not for this lining element and the strip of metal crept to a position in which its ends are aligned with the slot, and a compression of the resilient member took place, this compression would cause the ends to be bent into the slot and in some instances cause the end to be broken off and become jammed between the drive sleeve 29 and the sides of the slots 11, destroying the operativeness thereof.

The pin 16 between the side walls 12$^b$ carries a drive sleeve 29 and this sleeve is adapted to bear all wearing action to prevent the pin from being worn. The side walls 28$^a$ of the lining element 28 also serve to bear all of the wearing action between the drive sleeve 29 and the side walls of the slot 11 to prevent the hub body from becoming worn. This is desirable in that it is materially cheaper to replace the lining element 28 than to replace the hub body 10. The brake drum 30 is fastened to the hub 10 by a plurality of bolts 31, secured by lock washers 32.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A vehicle wheel, comprising a hub body for engagement on an axle and of cylindrical form and having a radial slot extending to its periphery, a rim body for supporting a tire and having annular side walls engaging the end faces of said hub body, a drive pin in a sleeve mounted between said side walls and passing through said radial slot, an annular resilient member mounted between the side walls of the rim body and the outside of said hub body, a strip of metal disposed between said hub body and resilient member and having its ends adjacent each other, and a U-shaped lining element engaged in said radial slot with its arms extending along the sides of the slot and its central portion bridging the open end of the radial slot for supporting the ends of said strip if they creep to a position over said radial slot.

2. A vehicle wheel, comprising a hub body for engagement on an axle and of cylindrical form and having a radial slot extending to its periphery, a rim body for supporting a tire and having annular side walls engaging the end faces of said hub body, a drive pin in a sleeve mounted between said side walls and passing through said radial slot, an annular resilient member mounted between the side walls of the rim body and the outside of said hub body, a strip of metal disposed between said hub body and resilient member and having its ends adjacent each other, and a U-shaped lining element engaged in said radial slot with its arms extending along the sides of the slot and its central portion bridging the open end of the radial slot for supporting the ends of said strip if they creep to a position over said radial slot, said rim body comprising a tire felloe for supporting said tire, and means for connecting one of said side walls to said tire felloe and a means for connecting the other of said side walls to the side wall connected to said rim portion.

3. A vehicle wheel, comprising a hub body for engagement on an axle and of cylindrical form and having a radial slot extending to its periphery, a rim body for supporting a tire and having annular side walls engaging the end faces of said hub body, a drive pin in a sleeve mounted between said side walls and passing through said radial slot, an annular resilient member mounted between the side walls of the rim body and the outside of said hub body, a strip of metal disposed between said hub body and resilient member and having its ends adjacent each other, and a U-shaped lining element engaged in said radial slot with its arms extending along the sides of the slot and its central portion bridging the open end of the radial slot for supporting the ends of said strip if they creep to a position over said radial slot, said rim body comprising a tire felloe for supporting said tire, and means for connecting one of said side walls to said tire felloe and a means for connecting the other of said side walls to the side wall connected to said tire felloe, said side walls being formed with offset portions for permitting the same to be connected together and also for engaging the outer periphery of said resilient member.

ELIAS GOLDBERG.